United States Patent

Branick

[15] 3,693,692
[45] Sept. 26, 1972

[54] TIRE BEAD BREAKING TOOL

[72] Inventor: Charles Earl Branick, 1601 S. 9th St., Fargo, N. Dak. 58102

[22] Filed: Dec. 23, 1970

[21] Appl. No.: 100,913

[52] U.S. Cl. .................................................157/1.17
[51] Int. Cl. ............................................B60c 25/06
[58] Field of Search ..........................157/1.17, 1.26

[56] References Cited

UNITED STATES PATENTS

| | | |
|---|---|---|
| 1,519,558 | 12/1924 | Snider ........................157/1.17 |
| 2,660,229 | 11/1953 | Taylor ........................157/1.17 |
| 2,771,941 | 11/1956 | Manupello .................157/1.17 |
| 2,775,290 | 12/1956 | Mondaro ....................157/1.17 |
| 2,900,016 | 8/1959 | Woodward ................157/1.17 |
| 2,901,029 | 8/1959 | Mraz ..........................157/1.17 |
| 3,374,819 | 3/1968 | Haynes .......................157/1.17 |

Primary Examiner—Granville Y. Custer, Jr.
Attorney—Duane C. Burton

[57] ABSTRACT

Portable tire bead breaking tool characterized by a body member having a pair of fixed spaced wedges and a movable pusher foot of like shape disposed therebetween; a pivoted lever for initially forcing the fixed wedges radially inward between a tire bead and a wheel rim flange; and a second pivoted lever for thence moving the pusher foot laterally relative to the fixed wedges for further forcing the bead away from the flange to a released position. A releasable device locks the second lever to the body member during the initial wedging action and, when unlocked, permits the second lever to translate the pusher foot through connecting linkage.

10 Claims, 5 Drawing Figures

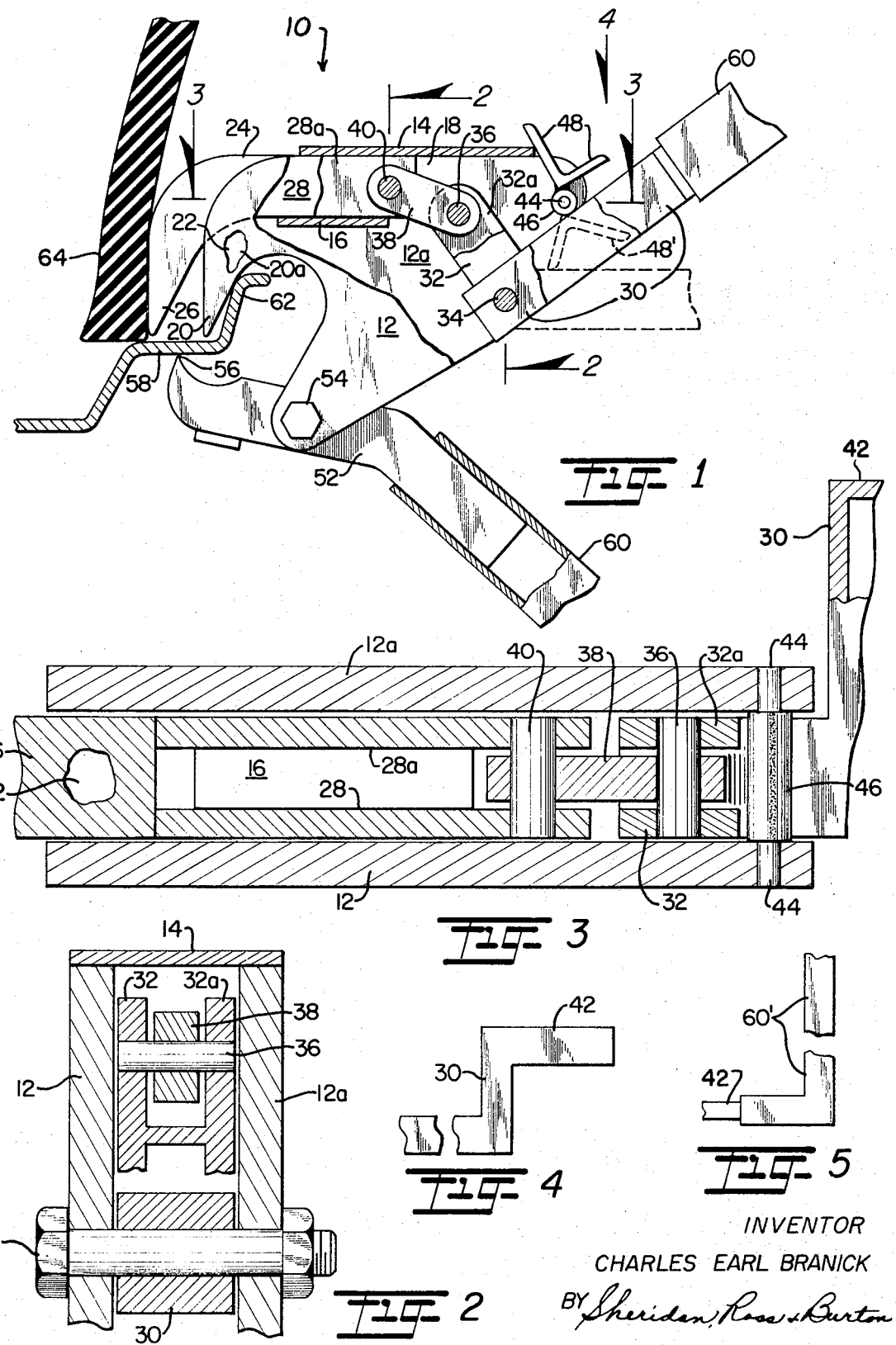

TIRE BEAD BREAKING TOOL

BACKGROUND OF THE INVENTION

As is well known in the art, it is common practice to remove a pneumatic tire from its supporting wheel by apparatus available at tire service stations, the wheel being dismounted or removed from the vehicle and secured in such apparatus after which the tire bead is broken away from the wheel side flanges by a movable member or foot which engages the tire adjacent the bead. Such apparatus is not only bulky and expensive but lacks portability. Moreover, it is not applicable for use when a wheel remains affixed to a vehicle.

To obviate the disadvantages just referred to, easily portable and inexpensive bead breakers have been devised so that a motorist or a farmer, for example, is enabled to effect a tire change or repair at a remote locus without resort to use of apparatus of the relatively non-portable type first referred to. Preferably such a portable device should also be effective to break the beads on a tire without removing the wheel from the vehicle since such removal is often unnecessary, for example, in the replacement or repair of an inner tube employed with a drop center wheel. In such operation, both beads are separated from the rim flanges and moved into the drop center channel after which one bead may be moved over a rim flange providing access to the tire for removing or replacing the tube. This presents another difficulty when the wheel remains on the vehicle since its suspension, such as an axle housing, presents an obstruction for bead breaking apparatus, which obstruction is not present at the outer bead.

Reference to prior art devices will better exemplify some of the problems involved. U.S. Pat. No. 2,775,290 discloses a portable bead breaker which is applied to a rim by rotation relative to same. While effective for breaking the outer bead, an obstruction such as an axle housing could render it inoperative for breaking the inner bead. Also, it requires a somewhat complicated power operated actuator. U.S. Pat. No. 2,771,941 obviates the power source just referred to but the manually operated levers could be inoperative on the inner bead where wheel suspension obstructions are present. In another known construction, which is probably the most closely related to the present invention, which is readily applicable to both rim flanges, despite the obstructions referred to, a pair of fixed spaced wedges are employed with a movable wedge disposed between same. The three wedges are driven by impact between the bead and flange, after which the central wedge, which then becomes a pusher foot, is hydraulically forced against the bead. Since this construction requires a hand operated hydraulic pump, high pressure hose, pistons, seals, etc., these complications add to the cost thereof.

SUMMARY OF THE INVENTION

The invention is characterized by a bead breaking tool which is manually operated by two levers. It comprises a pair of spaced fixed wedges with a movable bead pusher foot of similar shape disposed therebetween, which, in retracted position, is disposed in the space formed by opposite faces of the fixed wedges. A releasable lock retains the pusher foot in the position just described during which a pivoted lever engages the inner surface of the rim and forces the wedges and pusher foot radially inwardly between the bead and rim flange. The lock, which is associated with a second lever, is then released and the second lever is operated, which through a suitable link connection, rectilinearly translates the pusher foot against the bead, the two wedges then serving as abutments against the rim flange to resist the opposite force as the pusher foot moves laterally away from the wedges.

The principal objects of the invention are, accordingly, the provision of a portable lever operated tire bead breaking tool which is extremely compact, simple in construction and operation, and which positively grips a wheel rim to prevent disengagement therefrom.

Further objects, advantages and salient features will become apparent from the description to follow, the appended claims, and the accompanying drawing to now be briefly described.

BRIEF DESCRIPTION OF THE DRAWING

FIG. 1 is a side elevation of the subject of the invention, portions being broken away;

FIG. 2 is a section taken between staggered line 2—2, FIG. 1;

FIG. 3 is a section taken on line 3—3, FIG. 1;

FIG. 4 is a top plan of the square end of a lever 30 as viewed in the direction of arrow 4 in FIG. 1; and FIG. 5 is a side elevation of an alternative form of a handle.

DESCRIPTION OF PREFERRED EMBODIMENTS

Referring now to the drawing, bead breaker 10 comprises a pair of like side plates 12, 12a, secured together in parallel spaced relationship by transverse plates 14, 16, forming a rectangular channel or guideway 18 therebetween. The plates are preferably of steel, welded at their junctures. Plates 12, 12a are so shaped to provide a pair of transversely aligned wedges 20, 20a, forming a like wedge shaped space 22 therebetween.

Bead pusher foot 24 is formed with a like wedge shaped end 26 which, when retracted, fits within space 22. A pair of spaced plates 28, 28a are secured to the wedge shaped end, such as by welding, forming an integral part of the pusher foot. A lever 30, having bell crank ends 32, 32a is pivotally secured to plates 12, 12a by a cross pin or bolt 34 and free ends 32, 32a are connected by a pivot pin 36 to one end of a link 38, its other end being connected to plates 28, 28a by a pivot pin 40. As will be apparent, when lever 30 is rotated the pusher foot may be moved between its extended position, as shown in FIG. 1, to its retracted position within space 22. Lever 30 may be formed of square tubing, suitably welded together, and forming an offset handle engaging portion 42, best shown in FIGS. 3 and 4, and to which bell crank ends 32, 32a are welded.

A pin 44 extends between plates 12, 12a and pivotally carries a tube 46 to which is welded an angle member 48, best shown in FIG. 1. When in the position shown, lever 30 is free to rotate but when moved to the dotted position, as indicated by 48', lever 30 is blocked against rotation, the purpose of which will subsequently appear.

A lever 52 is disposed between plates 12, 12a and pivotally supported by a cross pin or bolt 54. Its left free end is provided with a sharp hardened end 56 which engages the exposed surface of wheel rim 58, preferably at a point or line thereon to the left (FIG. 1) of the points at which the ends of wedges 20, 20a engage the opposite unexposed surface of the rim. The other end of lever 52 is square in cross section and of the same dimensions as the square end 42 of lever 30, whereby handle extensions may be interchangably affixed to either of the levers.

As illustrated in FIG. 1, extension handles 60, 60 are formed of square tubing which telescopically fits the right ends of levers 30, 52. These may normally be employed when breaking an outer bead where obstructions to the swinging movement of the extensions is not present. When breaking the opposite or inner bead, however, obstructions may be present, such as an axle housing or the like, which prevents swinging movement of the levers. In such case, L-shaped extension handles 60' may be employed which orients their outer free ends to be moved and clear such obstructions. More specifically, one L-shaped extension handle telescopically fits over the square end 42 of the lever 30, as illustrated in FIG. 5, and the other L-shaped extension handle telescopically fits over the square shaped end of the lever 52.

In the operation of the apparatus it will be assumed that pusher foot 24 is retracted into space 22 between wedges 20, 20a and lever lock 48 has been moved to the dotted position 48'. The tips of wedges 20, 20a are disposed between the outer periphery of wheel flange 62 and tire bead 64. While holding lever 30 with one hand, lever 52 is rotated clockwise (FIG. 1) with the other hand, forcing wedges 20, 20a to the position shown. Lock 48 is then moved by a screwdriver blade, for example, to its unlocked position and lever 30 rotated counterclockwise. Pusher foot 24 then moves laterally from its initial position in space 22 to the position shown in FIG. 1 thus breaking the bead away from the wheel flange. The additional movement of the bead by the pusher foot is required since the inner periphery of the bead tightly engages rim 58 which may be tapered to larger diameter (such as 5°) in a direction toward the rim flange. Also, in certain types of "safety" rims the rim may have an annular ridge inwardly of the flange over which the bead must be forced before it is completely broken away from the rim.

As will now be apparent, when lever lock 48 is moved to its locking position 48', lever 30 forms an immoveable extension of plates 12, 12a and wedges 20, 20a. This permits the operator to control, by the orientation of lever 30, the direction of entry of the wedges between the rim flange and tire bead when lever 52 is operated and move the wedges in a proper direction to obviate damage to the bead which is particularly important with tubeless tires where the beads form an air seal with the wheel flanges.

Since the operator is normally pushing on lever 52, while holding lever 30 in a desired position, it is preferred that end 56 of lever 52 be offset inwardly of the tips of wedges 20, 20a. This produces a slight movement or couple between end 56 and the tips of the wedges which may readily be resisted by the restraining torque applied to lever 30. Thus, with a slight but variable force on lever 30, the direction of entry of the wedges may readily be controlled.

The end of pusher foot 24 may be of identical shape of the wedges if desired but may be of other shape, the important criterion being that it fit within space 22 between the wedges when in retracted position.

What is claimed is:

1. In a tire bead breaking tool for use with a vehicle wheel having laterally spaced circular rim portions with a radially outwardly extending flange adjacent each, each bead of a pneumatic tire having an inner peripheral surface seating on the outer surface of a rim portion and having a radially outwardly directed annular surface seating against an adjacent flange, the rim portions each having an exposed inner surface, said tool comprising;
   a. a pair of spaced members having like wedge shaped terminal ends adapted to be moved radially inwardly between a rim flange and a bead,
   b. a travelling foot disposed between said members and constrained to translatory movement,
   c. said foot having a terminal end disposed within the space between said wedge shaped ends,
   d. a first handle operated lever disposed between said spaced members and pivoted thereto,
   e. said first hand operated, pivotally mounted lever having a terminal end engageable with said exposed inner surface of a rim portion and adapted, when pivotally rotated, to force said wedges radially inwardly between a bead and its adjacent wheel flange and initially force the bead laterally away from same,
   f. a second hand operated, pivotally mounted lever disposed between said spaced members and pivoted thereto, having a portion connected to one end of said travelling foot for moving same, whereby the terminal end of the travelling foot engages the bead and further forces same laterally away from the adjacent wheel flange, freeing its locked engagement therewith.

2. A tool in accordance with claim 1 including a manually movable releasable lock for preventing movement of said second lever and the travelling foot when said first lever is being rotated, whereby the second lever may be grasped in one hand to resist the torque of the first lever as exerted by the other hand.

3. A tool in accordance with claim 1 wherein said second lever is of bell-crank shape having one end pivotally connected by a link to the travelling foot.

4. A tool in accordance with claim 1 wherein said terminal end of the first lever engages the rim portion at a point laterally inwardly from the tips of said wedge-shaped ends.

5. A tool in accordance with claim 1 wherein each of said levers comprises a relatively short portion telescopically receiving a relatively long portion for increasing its leverage.

6. A tool in accordance with claim 5 wherein the short portions are relatively offset to move in parallel planes to prevent interference of movement between the long portions.

7. A tool in accordance with claim 5 wherein at least one of the long portions is L-shaped to permit same to be swung without interference with vehicle obstructions, such as an axle housing or the like, disposed adjacent the inner bead of a vehicle mounted wheel.

8. A tool in accordance with claim 5 wherein at least one of the long portions is straight.

9. A tool in accordance with claim 5 wherein said relatively long portions are straight or L-shaped and interchangeably received by the short portions in any desired combination.

10. A tool in accordance with claim 1 wherein said pair of spaced members are flat plates, the wedge-shaped ends being formed integral therewith, said plates being secured together by a cross plate forming a wall for guiding one side of a rectangular travelling foot, and means extending between the plates forming another guide for the opposite side of the travelling foot, the plates forming the guides for the other two opposite sides of the travelling foot.

* * * * *